(12) United States Patent
Daton-Lovett

(10) Patent No.: US 11,787,160 B2
(45) Date of Patent: Oct. 17, 2023

(54) SLIT TUBE EXTENDIBLE MEMBERS AND METHODS FOR MANUFACTURING SAME

(71) Applicant: RTL Materials Ltd., Lymington (GB)

(72) Inventor: Andrew Daton-Lovett, Lymington (GB)

(73) Assignee: RTL MATERIALS LIMITED, Lymington (GB)

( * ) Notice: Subject to any disclaimer, the term of this patent is extended or adjusted under 35 U.S.C. 154(b) by 726 days.

(21) Appl. No.: 16/488,116

(22) PCT Filed: Feb. 22, 2018

(86) PCT No.: PCT/GB2018/050472
§ 371 (c)(1),
(2) Date: Aug. 22, 2019

(87) PCT Pub. No.: WO2018/154312
PCT Pub. Date: Aug. 30, 2018

(65) Prior Publication Data
US 2021/0277655 A1    Sep. 9, 2021

(30) Foreign Application Priority Data
Feb. 24, 2017 (GB) ..................... 1703040

(51) Int. Cl.
*B32B 27/08* (2006.01)
*B29C 70/34* (2006.01)
(Continued)

(52) U.S. Cl.
CPC ............ *B32B 27/08* (2013.01); *B29C 70/302* (2021.05); *B29C 70/34* (2013.01); *B32B 1/08* (2013.01);
(Continued)

(58) Field of Classification Search
CPC ............ E04C 3/005; B32B 7/022; B32B 1/08; B32B 3/08; B32B 5/12; B32B 5/26;
(Continued)

(56) References Cited

U.S. PATENT DOCUMENTS 3,503,164 A  *  3/1970  Medal ..................... H01Q 1/087
                                                    52/844
6,217,975 B1     4/2001  Daton-Lovett
(Continued)

FOREIGN PATENT DOCUMENTS

WO    88/08620    11/1988
WO    97/35706    10/1997
(Continued)

OTHER PUBLICATIONS

Winchester, D, "Radical technology in the pipeline," Offshore Engineer, Thomas Telford, London, GB, Jun. 1, 1999 (Jun. 1, 1999), pp. 19-21, XP002186633.
(Continued)

*Primary Examiner* — Theodore V Adamos
(74) *Attorney, Agent, or Firm* — Troutman Pepper Hamilton Sanders LLP

(57) ABSTRACT

Extendible slit tube members and methods for manufacturing extendible slit tube members are provided. In one aspect, an extendible member (10) comprises a laminated shell (2) of plural fibre reinforced layers (P1-P5) constructed and arranged to be configurable between a coiled form and an extended form. In the extended form (12) the shell is resiliently biased in the form of an elongate tube having longitudinal edges (14) defining a slit (3) along its length and wherein the shell can be opened out at the slit to assume a flattened form in which it can be wound about an axis extending transversely to its longitudinal direction to assume its coiled form (11). In the region of one or both longitudinal
(Continued)

edges (50), the amount of reinforcing fibre is less than in the region between the edge regions (51). In another aspect, a flexible cord (40) may be attached along the edge of a shell.

17 Claims, 6 Drawing Sheets

(51) Int. Cl.
| | |
|---|---|
| *B32B 1/08* | (2006.01) |
| *B32B 3/08* | (2006.01) |
| *B32B 5/12* | (2006.01) |
| *B32B 5/26* | (2006.01) |
| *B32B 37/06* | (2006.01) |
| *B32B 37/10* | (2006.01) |
| *E04C 3/00* | (2006.01) |
| *F16L 11/08* | (2006.01) |
| *F16L 25/00* | (2006.01) |
| *F16S 5/00* | (2006.01) |
| *B32B 7/022* | (2019.01) |
| *B29C 70/30* | (2006.01) |
| *B29L 23/00* | (2006.01) |

(52) U.S. Cl.
CPC .................. *B32B 3/08* (2013.01); *B32B 5/12* (2013.01); *B32B 5/26* (2013.01); *B32B 7/022* (2019.01); *B32B 37/06* (2013.01); *B32B 37/10* (2013.01); *E04C 3/005* (2013.01); *F16L 11/08* (2013.01); *F16L 25/00* (2013.01); *F16S 5/00* (2013.01); *B29L 2023/00* (2013.01); *B32B 2250/20* (2013.01); *B32B 2250/44* (2013.01); *B32B 2305/18* (2013.01); *B32B 2307/548* (2013.01); *B32B 2597/00* (2013.01)

(58) Field of Classification Search
CPC ......... B32B 37/06; B32B 37/10; B32B 27/08; B32B 2250/20; B32B 2250/44; B32B 2305/18; B32B 2307/548; B32B 2597/00; F16L 11/08; F16L 25/00; F16S 5/00; B64G 1/222; B64G 1/44; B29L 2023/00; B29C 70/34; B29C 70/302
See application file for complete search history.

(56) References Cited

U.S. PATENT DOCUMENTS

| | | | | |
|---|---|---|---|---|
| 6,256,938 | B1 * | 7/2001 | Daton-Lovett | H01Q 1/087 138/119 |
| 6,602,574 | B1 * | 8/2003 | Daton-Lovett | H01Q 1/087 428/36.1 |
| 10,864,697 | B2 * | 12/2020 | Daton-Lovett | B32B 3/08 |
| 2003/0182878 | A1 * | 10/2003 | Warren | B64G 1/222 52/108 |
| 2013/0061541 | A1 * | 3/2013 | Taylor | F16S 5/00 52/741.1 |
| 2015/0148886 | A1 * | 5/2015 | Rao | A61L 31/14 623/1.18 |
| 2015/0259911 | A1 * | 9/2015 | Freebury | B32B 5/00 52/108 |
| 2016/0177567 | A1 * | 6/2016 | Gandhi | E04C 3/005 29/897.33 |
| 2017/0058524 | A1 * | 3/2017 | Fernandez | E04C 3/005 |
| 2018/0142729 | A1 * | 5/2018 | Lee | F16F 3/02 |
| 2018/0250906 | A1 * | 9/2018 | Daton-Lovett | B32B 5/026 |
| 2018/0313083 | A1 * | 11/2018 | Murphey | E04C 3/28 |

FOREIGN PATENT DOCUMENTS

| | | | | |
|---|---|---|---|---|
| WO | | 99/62811 | 12/1999 | |
| WO | | 99/62812 | 12/1999 | |
| WO | | 02/25057 A1 | 3/2002 | |
| WO | WO-2012168741 A1 * | | 12/2012 | ............ B21D 53/00 |
| WO | WO-2015033085 A1 * | | 3/2015 | ............ E04H 12/34 |

OTHER PUBLICATIONS

International Search Report dated May 23, 2018 (May 23, 2018) in corresponding International Patent Application No. PCT/GB2018/050472.

British Search Report dated Jul. 7, 2017 (Jul. 7, 2017) in corresponding British Patent Application No. 1703040.4.

* cited by examiner

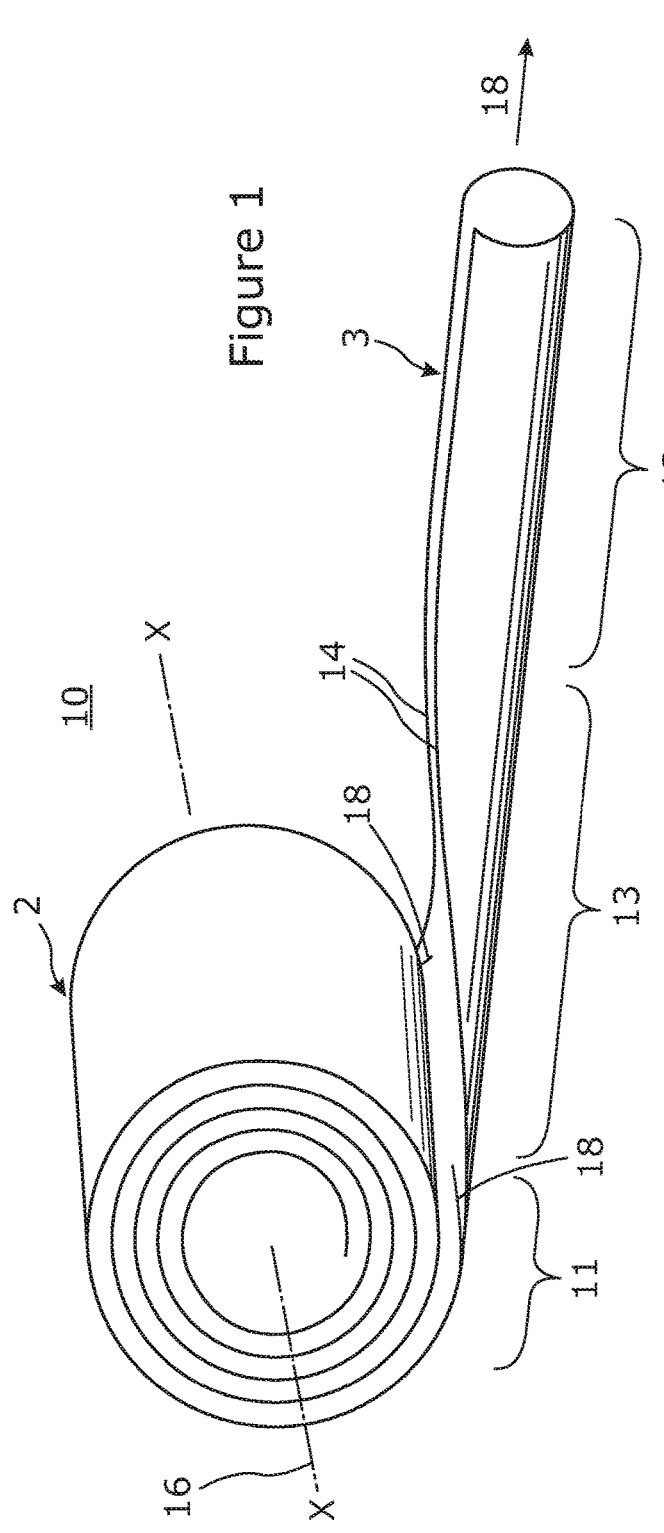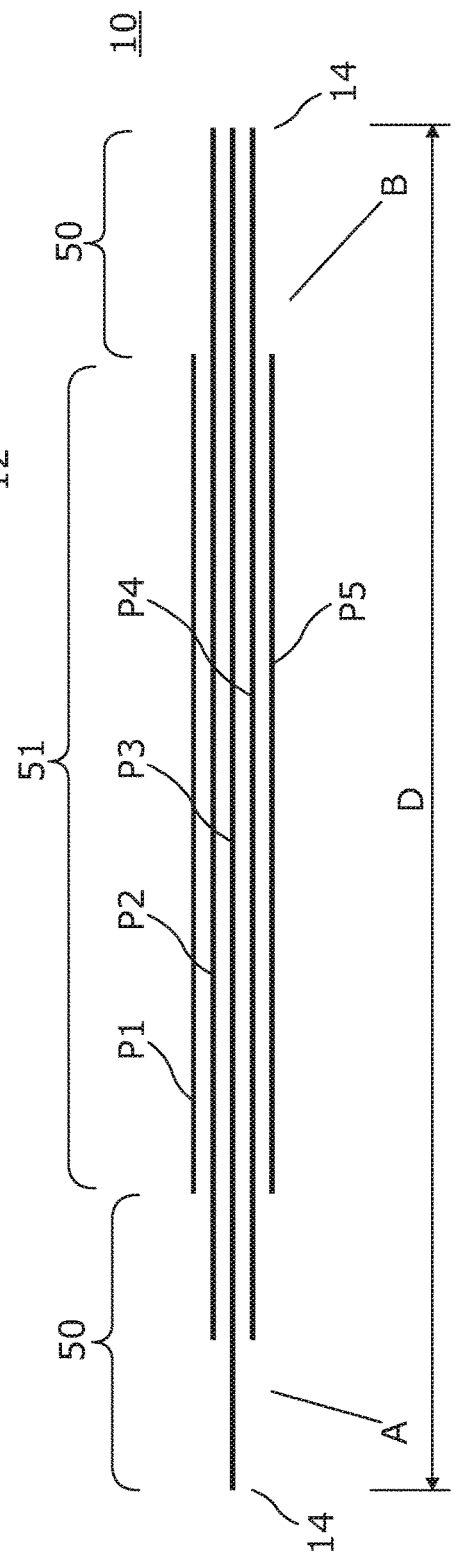

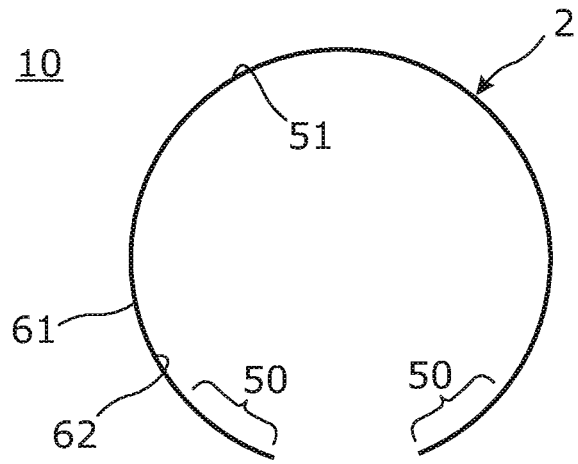
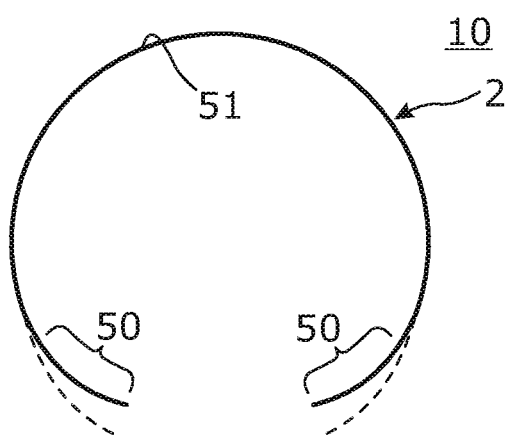
Figure 8a          Figure 8b
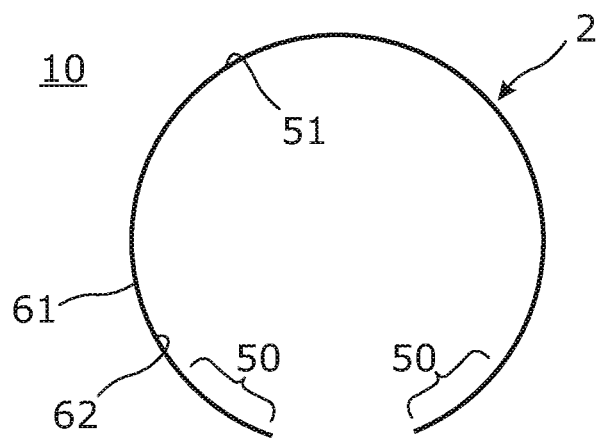
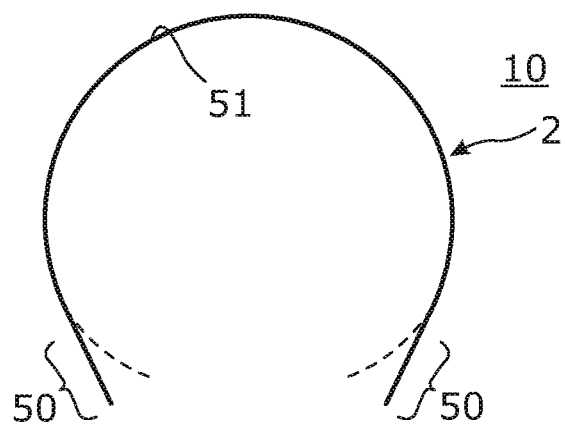
Figure 9a          Figure 9b

SLIT TUBE EXTENDIBLE MEMBERS AND METHODS FOR MANUFACTURING SAME

This application is a national phase filing under 35 U.S.C. § 371 of International Patent Application No. PCT/GB2018/050472, filed Feb. 22, 2018, which claims the benefit of British Patent Application No. 1703040.4, filed Feb. 24, 2017, each of which is incorporated herein by reference in its entirety.

The present invention relates to extendible slit tube members and methods for manufacturing extendible slit tube members.

Extendible members such as coiled composite masts and booms, STEMS (slit tube extendible members) and particularly BRCs (bistable reelable composites), are vulnerable to damage on the edges. This is due to both the strains incurred by coiling and from external impacts potentially received by the exposed edges. Damage to the edges can lead to premature failure of the device.

What is needed is an improved extendible member which addresses these potential problems.

According to an aspect of the present invention, there is provided an extendible member comprising a laminated shell of plural fibre reinforced layers constructed and arranged to be configurable between a coiled form and an extended form, wherein in the extended form the shell is resiliently biased in the form of an elongate tube having longitudinal edges defining a slit along its length and wherein the shell can be opened out at the slit to assume a flattened form in which it can be wound about an axis extending transversely to its longitudinal direction to assume its coiled form, wherein in the region of one or both longitudinal edges, the amount of reinforcing fibre is less than in the region between the edge regions.

This edge modification has the effect of reducing the strain experienced by the fibres in the edge region of the shell and making the member as a whole more resistant to damage. The fibre, having a higher modulus, contributes most to the stresses in the strained edge. In a BRC the fibre also causes the forces causing the inherent tendency of the material to curve longitudinally into the coiled form. So reducing the amount of fibre in the edge reduces net strain and thus increases cycle life of the member.

The edge region is preferably small compared with the overall width of the member. For instance, where the flattened member has a width D (as depicted in FIG. 2), the width of any one edge region may be between 1% and 25% of the width D. Preferably, the edge region will extend at least 2 mm from the edge such that the reduction of strain at the edge can be seen in members manufactured in accordance with common fibre reinforced composite technologies.

In an embodiment, at least one layer of the laminate does not extend as far towards the edge of the shell as at least on other layer of the laminate so as to reduce the amount of fibre in the region of that edge. This is a preferred arrangement to reduce the amount of fibre in the edge region as it lends itself well to the construction of the composite by laying up suitably sized layers of fibre, e.g. prepreg. This lends itself to layup on moulds or formers, or consolidation on the flat before being passed through a die or other former to set the matrix material in the final form of the tube.

In an embodiment, at least one outer layer of the laminate does not extend to the edge of the shell. The inner layers, being closer to the bending axis of the shell, experience lower strains than the outer layers. Thus, by having the outer layers stop before the edge of the shell, the strain in the edge portion is reduced.

In an embodiment, at least one inner layer of the laminate does not extend to the edge of the shell such that the separation of the outer layers of the laminate is less in the edge region compared with the region between the edge regions. This has the effect of reducing the path length difference experienced by the outer fibre layers as they undergo bending, which in turn reduces the strains experienced in these layers.

In an embodiment, at least three different layers extend to different transverse extents. In other words, the edges of the layers are staggered. This can create a smoother transition in strains experienced across the member as it is coiled and extended and so help reduce peak strains and prolong the life of the member.

In an embodiment, at least one layer has an uneven longitudinal edge profile. The edge can be sinusoidal, sawtooth, indented, zig-zag, or any other periodically repeating pattern. This helps further reduce local stresses by distributing stress concentrations rather than them lying along the straight lines of the fibre layer edge or edge of any flexible or ductile strip inserted into the edge. The uneven profile can also be used to reduce the fibre content in the edge region. In embodiments, at least one other layer has a straight edge and extends further out than the uneven edge such that it forms a straight line edge for the member.

In an embodiment, the outer layer or layers of the laminate have angled plies relative to the longitudinal and/or transverse axis of the member.

In an embodiment, the fibre in the outer layer or layers of the intrados and/or extrados faces of the extended shell are arranged such that the layers exhibit a higher Poisson's ratio in the direction of the longitudinal axis of the member than the inner layers causing increased stability of the shell when reconfigured from the extended form to the coiled form. This can help give rise to bistability or increased stability of the member when coiled.

In an embodiment, the member exhibits bi-stability in its coiled and extended forms.

In an embodiment, the member comprises a strip of flexible material attached to the shell in one or both edge regions to increase the bending stiffness of the edge. By increasing the bending stiffness, the peak curvature at the edge is made less tight without the local fibres experiencing an increase in strain.

In an embodiment, the flexible material at least partly takes up the space left by the at least one outer layer not extending as far as at least one other layer. Thus, a member can be formed having a uniform thickness.

In an embodiment, the laminate comprises a matrix material in which the reinforcing fibres are disposed and the flexible material is the same as the matrix material. This has advantages in manufacturing in that the stiffening strips can be incorporated into the produce as part of the process of forming the shell by including them in the layup. Using the same matrix material helps adhesion between the stiffening strips and the rest of the product. However, in other embodiments, the stiffening strips may use dissimilar materials or be applied to the shell after its manufacture, e.g. by using an adhesive or weld to attach the strips to the formed shell.

In an embodiment, the flexible material is a polymer or other ductile, elastomeric, elasto-plastic or visco-elastic material.

In an embodiment, the member comprises a flexible cord is attached along the edge of the shell. This helps protect the edge of the shell from impacts. It can also be used to stiffen the edge, such that the peak bending radius is reduced near the edge leading to a reduction in the strain experienced by the fibres in the edge region. As used herein, the term "cord" means any cord, bead or similar structure having relatively small cross section compared with its length suitable for running along the edge or edges of the shell. The cord may have any suitable cross sectional profile, such as circular, square, D-shape, etc. The cord may have a thickness in cross section that is between 75% and 150% of the overall thickness of the member in the region between the edges.

In an embodiment, a flexible fabric or fibre sheath is used to attach the flexible cord to the edge of the shell.

According to a second aspect of the present invention, there is provided a method of manufacturing an extendible member comprising laying up fibre reinforced plies and applying heat and/or pressure to form a laminate shell, the extendible member constructed and arranged to be configurable between a coiled form and an extended form, wherein in the extended form the shell is resiliently biased in the form of an elongate tube having longitudinal edges defining a slit along its length and wherein the shell can be opened out at the slit to assume a flattened form in which it can be wound about an axis extending transversely to its longitudinal direction to assume its coiled form, wherein in the region of one or both longitudinal edges, the amount of reinforcing fibre is less than in the region between the edge regions.

In an embodiment, a strip of flexible material is added to one or both edge regions in the layup to increase the bending stiffness of the edge.

In an embodiment, the plies are laid up on a mould or jig having a first cross sectional shape, and wherein the formed laminate shell has a second cross sectional shape, different from the first cross sectional shape, wherein the change of shape arises from the edge region having a different shrinkage or creep compared to the central region of the member. Thus, the mould may be designed to take account of expected shrinkage or creep in the member due to any of the edge modification techniques disclosed herein to achieve a member having a desired, predetermined cross section.

Alternatively, in embodiments where it is desired for the cross sectional shape not to change during the manufacturing process, the width of the edge regions may be kept relatively small to reduce the effects leading to a change in cross section. For instance, the edge regions may have a width of less than 5% of the overall width D of the member.

According to a third aspect of the present invention, there is provided an extendible member comprising a shell constructed and arranged to be configurable between a coiled form and an extended form, wherein in the extended form the shell is resiliently biased in the form of an elongate tube having longitudinal edges defining a slit along its length and wherein the shell can be opened out at the slit to assume a flattened form in which it can be wound about an axis extending transversely to its longitudinal direction to assume its coiled form; and a flexible cord is attached along the edge of the shell.

According to a fourth aspect of the present invention, there is provided a method of manufacturing an extendible member comprising laying up fibre reinforced plies, placing a cord adjacent one or more edges of the plies and applying heat and/or pressure to form a laminate shell where the cord is fixed to the edge or edges of the shell, the extendible member constructed and arranged to be configurable between a coiled form and an extended form, wherein in the extended form the shell is resiliently biased in the form of an elongate tube having longitudinal edges defining a slit along its length and wherein the shell can be opened out at the slit to assume a flattened form in which it can be wound about an axis extending transversely to its longitudinal direction to assume its coiled form, wherein the cord is positioned and sized so as to mitigate excess pressure being experienced by the edge or edges of the shell compared with a central portion of the shell between the edges of the shell.

Thus, undesired edge effects such as over compaction compared with the central region of the member between the edge regions, can be mitigated without having to use a complicated, custom mould or jig or similar.

In an embodiment, a flexible fabric or fibre sheath is used to attach the flexible cord to the edge of the shell.

The cord may be attached as part of the lamination process for forming the shell, or may be attached as a later step.

The member when extended may be have any desired length and may be significantly longer when extended to its size when coiled, e.g. having an extended length at least 5 times the width of the member, and/or the coil having at least 5 turns.

The member may be formed from a sheet-like material having first and second longitudinal edges that is folded in on itself longitudinally to form a tube or a longitudinal section of a tube when the member is in the extended form.

The member may be constructed such that, in transverse cross section, the extended form of the member subtends any one from a wide range of angles. As will be appreciated, the angle can be chosen to be relatively small, but should be large enough to give stiffness to the extended member to aid in deployment and control the positions and/or tensions of the sensors running along the member. For example, an angle greater than 20 degrees will be preferred in most cases. Using a larger angle can be useful in some cases to give additional stiffness. The angle can be 360 degrees or more, so the edges meet or overlap allowing a "closed" tube to be formed, which may be desirable in some situations. However, in some embodiments, the angle may be between 45 and 170 degrees. Preferably in transverse cross section the extended form of the member is generally curved.

The member may be formed from a bistable material having a first stable form when it is in the coiled form and a second stable form when it is in the extended form.

According to a fifth aspect of the present invention, there is provided an extendible member comprising a laminated shell of plural fibre reinforced layers constructed and arranged to be configurable between a coiled form and an extended form, wherein in the extended form the shell is resiliently biased in the form of an elongate tube having longitudinal edges defining a slit along its length and wherein the shell can be opened out at the slit to assume a flattened form in which it can be wound about an axis extending transversely to its longitudinal direction to assume its coiled form, wherein in the region of one or both longitudinal edges, the edge is modified to reduce the strain on the fibres when cycling between the extended and coiled forms.

It will be appreciated that any features expressed herein as being provided "in one example" or "in an embodiment" or as being "preferable" may be provided in combination with any one or more other such features together with any one or more of the aspects of the present invention. In particular, the extendible member, joining techniques and join testing system described in relation to one aspect may generally be applicable to the others.

Embodiments of the present invention will now be described by way of example with reference to the accompanying drawings, in which:

FIG. 1 shows an example of a (STEM) slit tube extendible member;

FIGS. 2 to 7 show cross sectional views of different examples of slit tube extendable members according to embodiments of the present invention where the member is in the coiled form;

FIG. 8a shows a cross sectional view of an example of a member according to an embodiment of the present invention when extended showing the member as originally formed, and FIG. 8b shows the member of FIG. 8b after the forming process is complete;

FIG. 9a shows a cross sectional view of another example of a member according to an embodiment of the present invention when extended showing the member as originally formed, and FIG. 9b shows the member of FIG. 9b after the forming process is complete;

Figure 3:
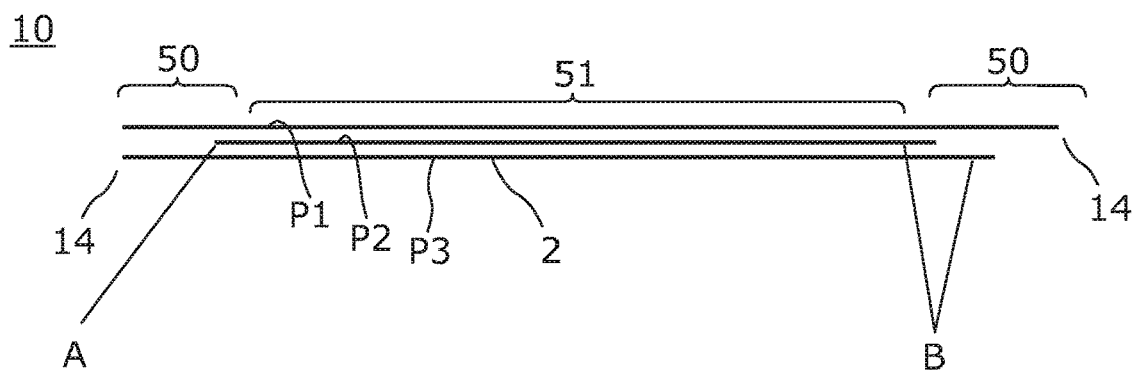

FIG. 1 shows an example of an extendible member 10 comprising a fibre reinforced shell 2. The member 10 can be reconfigured between a coiled state 11 and an extended state 12, via a transition stage 13. In the extended state 12 the member is generally elongated and biased to have a curved or non-linear cross section in a direction transverse to the longitudinal axis 18 of the member. (References to longitudinal axis or longitudinal extent or direction of extension or retraction in this document generally refer to this axis 18). Thus, the longitudinal edges 14 form a slit 3 in the generally curved, tubular form. This curvature can be adapted and thus the cross section of the extended portion can comprise anything from a closed or substantially closed circular shape, or other generally closed shapes. The member 10 is resiliently biased in this curved cross section when extended. This gives structural rigidity to the member 10 when extended. In the coiled state 11 the member 10 is generally opened out at the side longitudinal edges 14 to have a flat cross section, and is coiled around an axis 16 that is transverse to the longitudinal axis 18 of the member 10. The shell 2 is thin to aid coiling, e.g. typically between 0.5 mm and 5 mm for most applications. Such members are sometimes referred to as STEMs (Slit Tubular Extendable Members).

In the present example, the shell 2 may be formed from a thermoplastic matrix with fibre reinforcements, such as a fibre reinforced polymer ("FRP" hereafter). The fibres may be glass, carbon, or aramid, while the polymer may be polypropylene, polyethylene, a polyamide, polyester thermoplastic, poly-ether-ether-ketone or any other polymer suited to the particular requirements of the task at hand. The composite material may comprise a single layer or plural layers with fibres oriented in different directions in each lamina. The use of fibrous materials mechanically enhances the strength and elasticity of the plastic matrix. The extent that strength and elasticity are enhanced in a fibre reinforced plastic depends on the mechanical properties of both the fibre and the matrix, their volume relative to one another, and the fibre length and orientation within the matrix. FRPs are widely used in many areas such as aerospace and automotive industries, and are not described in detail herein.

In the present example, the member 10 is a bistable reelable composite (BRC). Such a bistable member has a first stable state in the coiled form 11, where the cross section of the member 10 is generally flat and a second stable state in the extended form 12, where the cross section of the member is curved as previously described. The bistable member 10 may be capable of reversible configuration between its coiled and extended forms a plurality of times. Suitable structures are disclosed in the following international patent applications, each of which is incorporated here by reference: WO A 88/08620, WO-A-97/35706, WO-A-99/62811, and WO-A-99/62812. Such bistable structures are available from RolaTube Technology Limited of Lymington, the United Kingdom.

In general, there are two ways to make a tube bistable; either by altering the bending stiffnesses of the structure so that it is no longer isotropic, for instance by using a fibre-reinforced composite, or by setting up an initial prestress in the structure. The BRC in the present example uses the first technique. This involves arranging the fibres to increase the torsional stiffness, and increase the coupling between bending in the longitudinal and transverse directions. This can be achieved by ensuring that in the surface layers of the BRC, i.e. those offset from the midplane of the BRC, stiff fibres are angled relative to the longitudinal axis, e.g. at ±45°. A simple example is the anti-symmetric [+45°/−45°/0°/+45°/−45°] fibre lay-up.

In engineering terms these surface layers have high Poisson's ratios in the directions parallel and perpendicular to longitudinal axis of the member. It is well known that as a curved shell is straightened the inner surface gets longer and the outer surface gets shorter. Thus, when a section of the extended tube is opened, as the initial curvature straightens, the surface fibres are deformed which, due to their high Poisson's ratio, exert a force acting to curve the opened section longitudinally into its coiled form. The tube coils with same sense curvature, i.e. the centre of curvature is on the same side of the structure in both forms.

Normally when something is bent the amount of energy stored by that bending (the total strain energy) rises as the degree of bending increases. In BRCs, once the initial curvature is straightened as the tube is opened, the stiffness along the longitudinal axis drops and the forces acting on the material of the tube arising by the deformed surface fibres can act to flip it into the coiled form. As this second curves forms, the total strain energy drops, thereby forming a second stable form, or more stable form, for this section.

These principle operate in reverse when moving from the coiled state to the extended state.

Thus, structural members are formed that exhibit a stable geometry in both the extended and coiled states. These manage the problems of difficult handling and complicated mechanisms by forming STEM type structures from materials that have been engineered so as to make them easy to coil and handle.

STEMs and particularly BRCs, are vulnerable to damage on the edges, both due to the strains incurred by coiling and from impact which will always tend to exhibit areas of maximum strain at the points on either side of the coil 11 where the transition from extended mast to coil takes place. The peak strain tends to run onto the material where the tightest curvature is seen on the edge at the point of transition between coil and extended form and the extended form. The strain level and distribution are defined by the curvature at this point and by the thickness, angle of plies and material from which the BRC is formed.

This is exacerbated to some extent by the nature of a fibre reinforced composite, which will tend to propagate fractures along the line of fibre reinforcement. This is particularly potentially damaging where the fibre direction in one or more layers is aligned with the line of peak strain.

FIG. 1 shows lines of peak strain in the section transitioning between coiled and extended. The shell in this transition section 13 forms a Gaussian surface having curvature both longitudinally and transversely. It can be seen from this drawing that the curvature reaches its tightest point closest to the edges 14, and, progressing along the member away from the coil 11, increases its bend radius as it gets closer to the centreline. It follows that if the edges can be made less vulnerable to strain induced damage than the device as a whole will be similarly affected, as the rest of the material is not exposed to as much strain.

In addition to being the primary site of stress/strain initiated failure the edge is also the weakest part of any STEM of significant thickness relative to its diameter. If the material is thin enough, as is the case in most metallic STEMs, then impact on the face giving rise to local buckling may be the most likely impact failure mode, but where the thickness or nature of the material are such that this is unlikely, such as in Fibre Reinforced Composites, then edge impact is the most likely area of impact damage.

So modifying the edge of, particularly, a composite STEM or BRC can both reduce cyclic strain and/or mitigate against impact damage.

FIG. 2 shows in cross section an example of the layup for a composite STEM where fibres on the outer layers P1, P2, P4 and P5 are angled with respect to the longitudinal axis and the fibres in the inner layer P3 is aligned with the longitudinal axis. For example a [+45°/−45°/0°/+45°/−45°] fibre lay-up may be provided. This is a typical arrangement of fibres for a bistable member. It will be appreciated that, for reasons of clarity in showing the different layers, the layers in FIGS. 2 to 7 are depicted with greater separation of the layers than would normally be the case in practice. It will also be appreciated that the principles disclosed herein may be used with many other different layups, including different number of layers and orientations of fibre.

The shell 2 has edge regions 50 and a central portion 51 between the edge portions 50. As can be seen, the edge portions 50 have less reinforcing fibre than the central portion 51 of the shell on account of one or more layers of fibre not extending to the edge 14 of the shell 2. This edge modification may be achieved in a number of ways, as shown by FIGS. 2 and 3. It should be noted that in FIGS. 2 and 3, each side A,B of the member 2 is shown with a different edge modification. Although the edges 14 may have different arrangement of fibre, this is mainly intended for ease of illustration and it will be appreciated that in many cases the opposed edges 14 will have the same arrangement, which may be any of those illustrated or disclosed herein. Similarly, in FIGS. 4 and 5, described below, the edge modification can be the different at each side A,B of the member 2, as shown, or the edge modification can be the same at each side A,B.

The fibre, having a higher modulus compared with the matrix material of the composite, contributes most to the stresses in the strained edge 14. In a BRC the fibre also causes the forces causing the inherent tendency of the member 2 to curve longitudinally into the coiled form. So reducing the amount of fibre in the edge region 50 reduces net strain and thus increases cycle life of the member 10.

If the fibre is taken from the angled plies on the outer faces, as in FIG. 2, side B of the member 2, or from more than one external face ply in a manner similar to that shown in FIG. 2, side A of the member, this causes a reduction in the forces causing the tendency to self-coil and thus moves the peak strain inwards from the edge, reducing the tendency to failure due to bending strain in the edges.

Having a staggered edge of fibre layers as in FIG. 2, side A of the member 2, can help achieve a more gradual reduction in strain in the edge region 50 and avoid large transitions which might initiate failure in the member 2 over many cycles of extension/coiling.

FIG. 3, side A of the member 2, shows the fibre removed taken from an internal ply or plies P2 in the edge region 50. FIG. 3, side A shows the layers before they are consolidated in to a laminated product. It will be appreciated that when the layers are consolidated under pressure, then the distance between the angled ply faces in the edge region 50 may be reduced compared with the central portion 51. Thus, the path length difference is reduced between the fibres in the external plies P1,P3 in the edge region 50 as the shell 2 transitions between the curved forms, leading to lower strains and giving rise to the same effect in reducing strain in the edge regions 50.

The two types of fibre reduction can be combined in any manner desired, one possible combination being shown in FIG. 3, side B of the member. Here the boundary of inner ply P2 extends least far towards the edge 14 in the edge region 50, and the outer plies P1 and P3 have boundaries that are offset from one another, with the boundary of the first ply P1 being outermost and defining the edge 14 of the shell 2.

In other examples, the edge region 50 can be reinforced by increasing or adding a strip 30 of polymer or other ductile, elastomeric, elasto-plastic or visco-elastic material that is able to flex to tight radii without failure. This flexible strip has a higher strain to break ratio in bending than the fibre reinforced main body of the shell 2. This has the effect of increasing the stiffness of the area of peak strain, without increasing the strain in the fracture prone reinforcing fibres. In some examples, this strip 30 is made from a material that is also impact fracture resistant.

Figure 4:
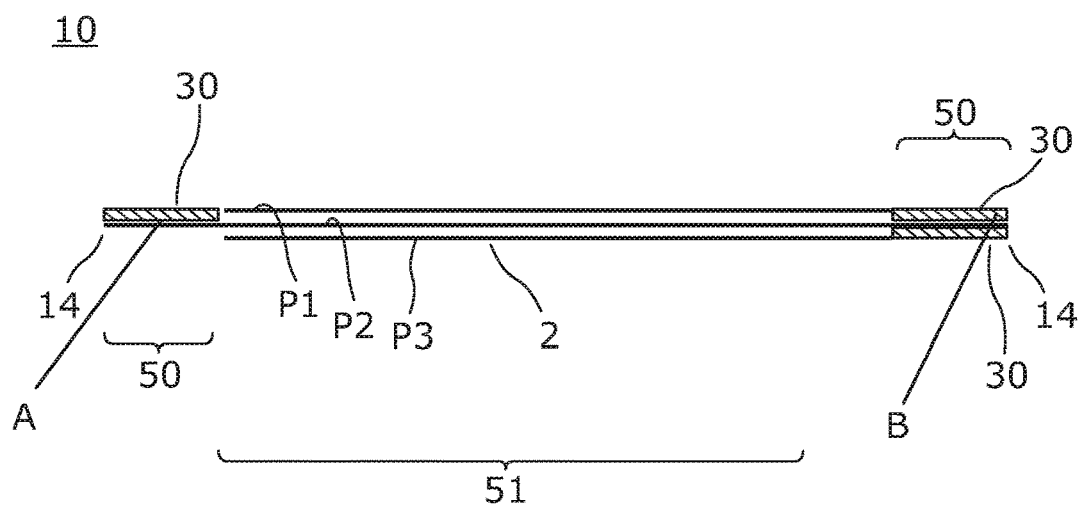

The flexible strip 30 can be combined with the reduction in fibre in the edge regions 50 described above. For example, as shown in FIG. 4, side A of the member 10, a flexible strip 30 formed of polymer or other ductile, elastomeric, elasto-plastic or visco-elastic material is applied in the edge region 50 where one (P1) of the outer layers P1,P3 of fibre does not extend to the edge 14 of the shell 2. In FIG. 4, side B of the member 2, both outer faces P1, P3 have opposing stiffening strips 30 of polymer or other ductile, elastomeric, elasto-plastic or visco-elastic material. Typically, the flexible strip 30 is relatively thin compared to the overall thickness of the shell 2, so as, in some embodiments, not to increase the overall thickness of the shell 2 substantially, as this may interfere with the ability of the member 10 to coil. For instance, in some embodiments, the strip 60 may have a thickness less than half of thickness of the shell 2 in the central portion 51. In some embodiments, the thickness and/or width of the strip 60 is similar (to within say 20%) to the dimensions of the space left by the reduced fibre layer or layers, and may occupy that space left unoccupied by the missing fibre. Thus, the overall thickness of the shell 2 may be maintained (to within say 20%) across the full width of the shell 2 if desired, with the flexible strip 30 taking the place of one of more plies of fibre in the edge region 50.

Any arrangement that may prove of utility can be used, including combinations in which the added material is placed between plies of the composite instead of, or as well as, being placed on one or both faces of exposed plies and arrangements that are either symmetric or asymmetric about one or more of the composite plies. It will furthermore be appreciated that the techniques described herein are not limited to having 3 plies, but can equally be used with any plural number of plies desired to form a member of the desired properties.

Figure 5:
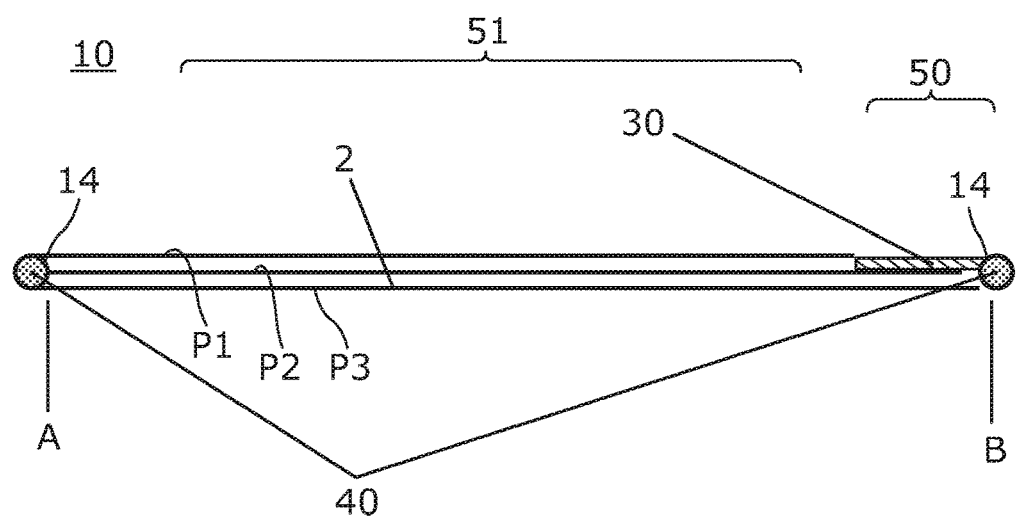

In the example of FIG. 5, the sides A and B of the member 10 comprise a cord, bead or other material 40 (generally referred to herein as a "cord" without loss of generality) that runs along the respective edge 14 of the shell 2 to prevent impact damage to the edge region 50 of the composite member 10. It can also act in a similar manner to the flexible strip 30 in FIGS. 4, by providing a flexible area that also has sufficient stiffness to increase the minimum bending radius in the transition are, thus reducing peak strain. In the example of FIG. 5, side B of the member, a cord is used in addition to a flexible strip 30 to protect the edge 14 of the shell 2 and increase its stiffness.

The cord or bead 40 may be made from any material that flexes well enough to go through the transitions from the coiled state to the extended state and back. Like the flexible strip 30, the cord or bead 40 may have a higher strain to break ratio in bending than the fibre reinforced main body of the shell 2.

The cord or bead 40 may for example be glued or welded to the edges 14 of the shell 2.

Figure 6:
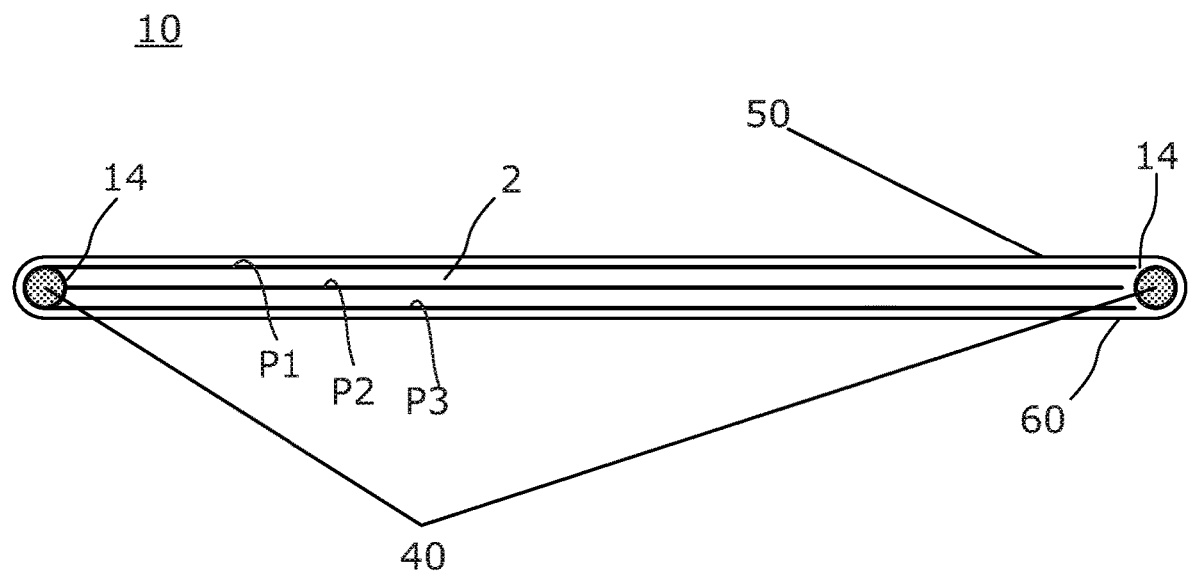

As shown in FIG. 6, the cord or bead 40 can be secured by having a tubular fibre or fabric layer 60 incorporated into the structure, lying around the composite layers of the shell 2 and the cord or bead 40 and secured by being incorporated into the structure during the manufacturing process or by means of an adhesive or other suitable means.

Figure 7:
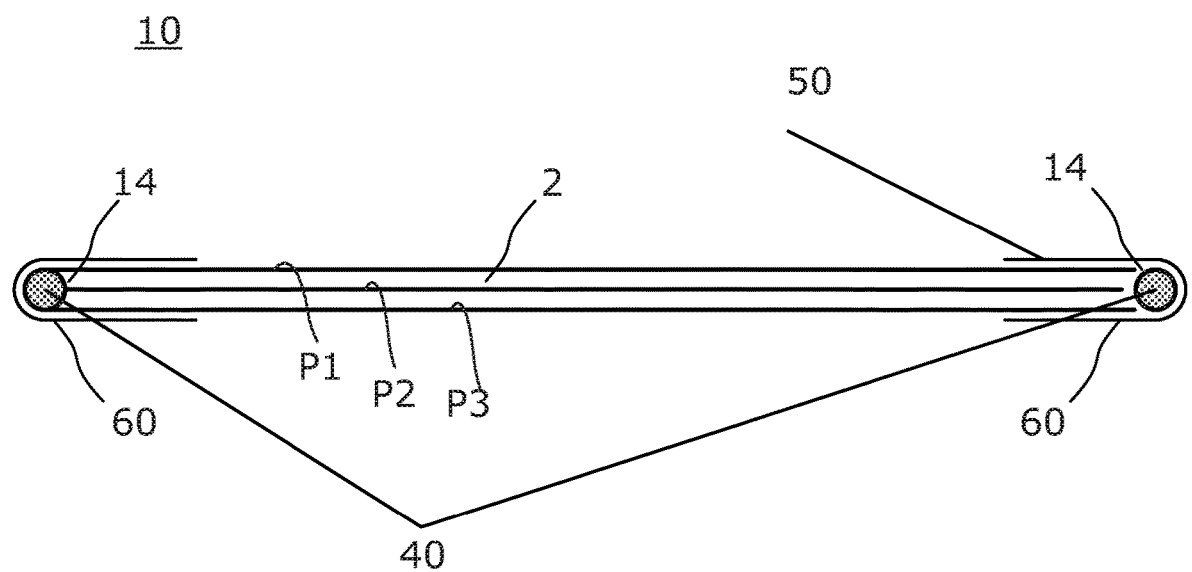

Alternatively, as shown in FIG. 7, securing fibre or fabric layers 60 can be located such as to run over the edge regions and secured by being incorporated into the structure during the manufacturing process or by means of an adhesive or other suitable means.

The bead or cord 40 may be attached to the shell 2 after the component plies of the composite are laminated together to form the shell 2. Alternatively, the bead or cord 40 may be attached as part of the lamination process.

In addition to the improvements to impact and strain tolerance, the use of a cord or bead 40 can, provided it is made from a material that can survive the conditions of manufacturing the composite, act as an effective edge to the forming of the composite laminae by preventing edge compaction due to radial pressure, thus removing the need for some form of supporting feature or jig to ensure the thickness of the edge is preserved. As will be appreciated, radial pressure is often applied at some stage during the manufacture to consolidate the layers, e.g. using vacuum forming, or a clam-shell die, spiral wrapping on a mould, or consolidating the layers on the flat before passing them through a shaping die in which they are cured or set are all examples of ways in which the composite member might be manufactured. This pressure can lead to over-compaction at the edges 14 of the member 10 due to the exposed nature of the edges 14. This is particularly a problem where an internal layer of the composite does not extend to the edge, for example as shown in FIG. 3, in which case there is an added tendency for the external layers in the edge regions 50 to compress due to the absence of the internal layer in this region, thereby decreasing the overall thickness of the member 10.

Figure 10A:
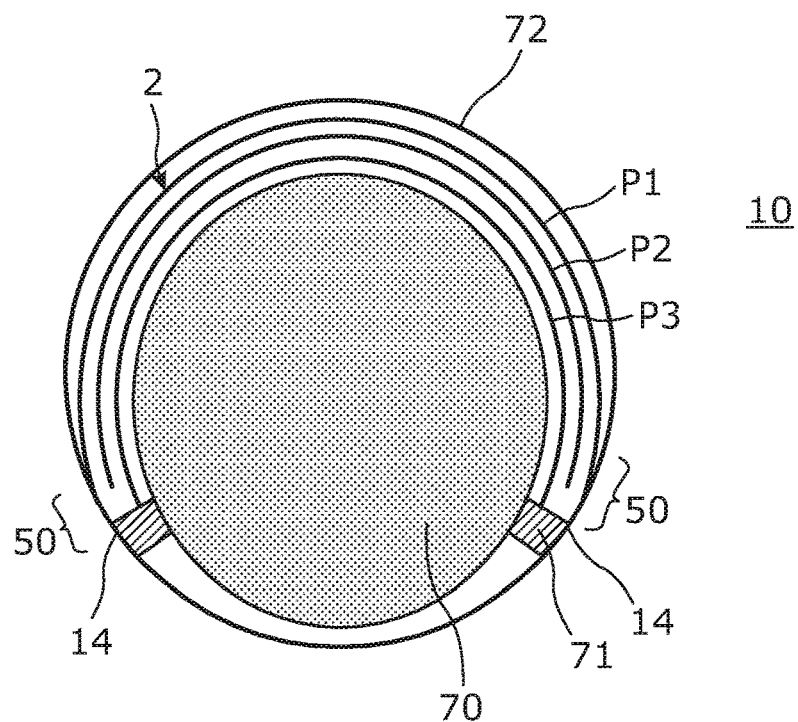
FIGS. 10a and 10b show cross sectional views of examples of members according to embodiments of the present invention being manufactured; and, FIGS. 11 and 12 show different edge profiles of a layer of examples of a member according to an embodiment of the present invention.

This problem could be addressed by using some form of external support during manufacture to maintain the gap. For instance, as shown in FIG. 10a, this might be addressed by introducing one or more supporting feature 71 into the mould 70 adjacent the edge or edges 14 of the member 10. To form the member, the component plies P1, P2, P3 of the shell 2 and any flexible strips 30 are laid up on the mould 71 secured in place by spirally binding it with tape 70 that shrinks when heated. When heat is applied, the spiral wrapping 72 shrinks causing external pressure to be applied to the component plies which consolidates the plies as well as curing or setting the product. In this arrangement, the supporting features 71 locally relieve the pressure experienced by the edges 14 and thus reduce compaction at the edge region 50.

Figure 10B:
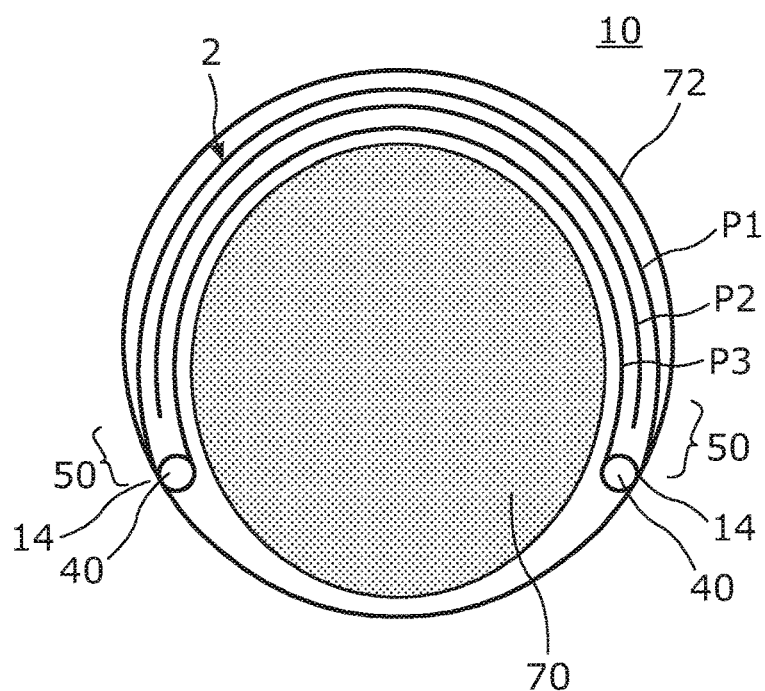

However this arrangement complicates the mould 70 and means that the distance between the edge features 71 must be carefully matched to the width of the member 2 being formed. Alternatively, as described above, a cord or bead integrated into the edge 14 of the member may be used instead of having supporting features 71 in the mould, as shown in FIG. 10b. In this way, the edge region 50 of member is protected from over compaction during the application of pressure and head to cure or set the product 10. This would allow a simplified mould or jig to be used in forming the composite member 10. For instance, a simple tube or rod conforming to the desired cross sectional shape of the extended member 10 can be used as a mould.

Thus in this example it is preferred that the bead or cord 40 is at least as thick as the overall thickness of the shell 2, or close thereto (e.g. greater than 75% of the thickness of the member 2). In most applications, it is expected that the bead or cord 40 will be not greatly exceed the thickness of the shell (e.g. less than 150% of the thickness of the member), so as to not significantly interfere with the ability of the member 10 to coil. However, these requirements may vary according to the particular application and form of the member 10.

In addition to providing protection against cyclic strain and impact damage, modifying the edge regions 50 in the ways described herein may cause changes or cause the tendency to changes in the form of the member 10, both in the extended cross-sectional profile, as well as causing bending along the length of the member. This may be as a result both of thermal or other forms of shrinkage as a result of imbalanced stresses arising from asymmetrical fibres in the structure, or from creep in the material whilst in the coiled state. These changes are most prominently seen where the width of the modified edge region or regions is large relative to the overall width D of the flattened member.

For example, FIG. 8a shows a cross section of the member 10 when being formed in an extended state. As can be seen, in this example, the cross sectional form is generally circular with a gap between the edges 14, so as to form a slit tube structure when extended. Thus, the member 10 may be formed on a circular mould or jig by laying up layers of fibre or prepreg, although it will be appreciated that the principles can be extended to other cross sections and construction techniques. In this example, the fibres are removed from the intrados face 62 (i.e. inner surface) along the edge region 50, leaving the balance of the fibre towards the extrados face 61 in this region. When the shell 2 is formed by curing the matrix polymer, then, as shown in FIG. 8b, shrinkage in the matrix polymer will tend to cause the edge region 50 to curve to a greater degree than the original form (shown in broken line) and thus to a greater degree than the central portion 51 of the member 2. Similarly, if the fibre is removed from the extrados face 61 in the edge region 50, the edge region 50 will curve to a lesser degree.

FIGS. 9a and 9b show an example where bead 40 or the flexible strip 30 comprises a significant amount of a ductile, elasto-plastic or visco-elastic material. As shown in FIG. 9a, the member 10 is formed with a generally circular cross section. After being formed, and then when configured into the coiled state, the member 10 will tend to exhibit some elasto-plastic behaviour overall, generally leading to gross deformation of the edge regions 50 of the member 10. As a result, as shown in FIG. 9b, when the member 10 is extended again, this deformation gives rise to a cross sectional profile in which the edge regions 50 extend along a larger radius of curvature than the original form (shown in broken line) and thus larger than the central portion 51 of the member 10.

Where the modified edge region or regions 50 are relatively small, e.g. less than 5% of the overall width D of the flattened member, there is generally expected to be no significant change in profile. However, as the modified edge region 50 increases in size, then the tendency to change the profile of the member becomes more significant. As will be appreciated, the this tendency can be counteracted or reduced by careful selection of other design factors in the overall construction of the member. Thus, there is no hard and fast rule as to the ratio between the width of the modified edge regions 50 relative to the overall width D which will give rise to a particular change in profile.

Thus, in some applications, it may be desirable to use these effects to give rise to a definite change in profile. Where it is not desirable for this effect to arise, the tendency can be taken into account in designing the modified edge.

It is also noted that a reduction of fibre in the edge region 50 may cause shrinkage in the composite when the product is cured or set that may cause a curvature in the member 10 in the longitudinal direction. Thus, it may be desirable to form the composite member 10 on a former that has a slight curve to balance out this tendency in order that the final product extends in a straight line, where a straight form is desirable.

Figure 11:
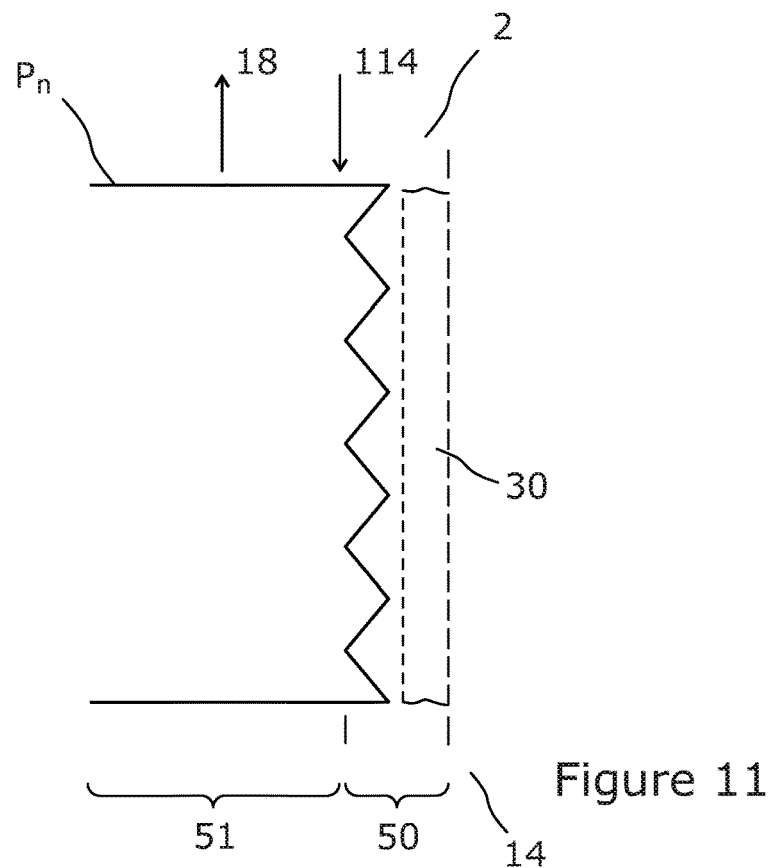
Figure 12:
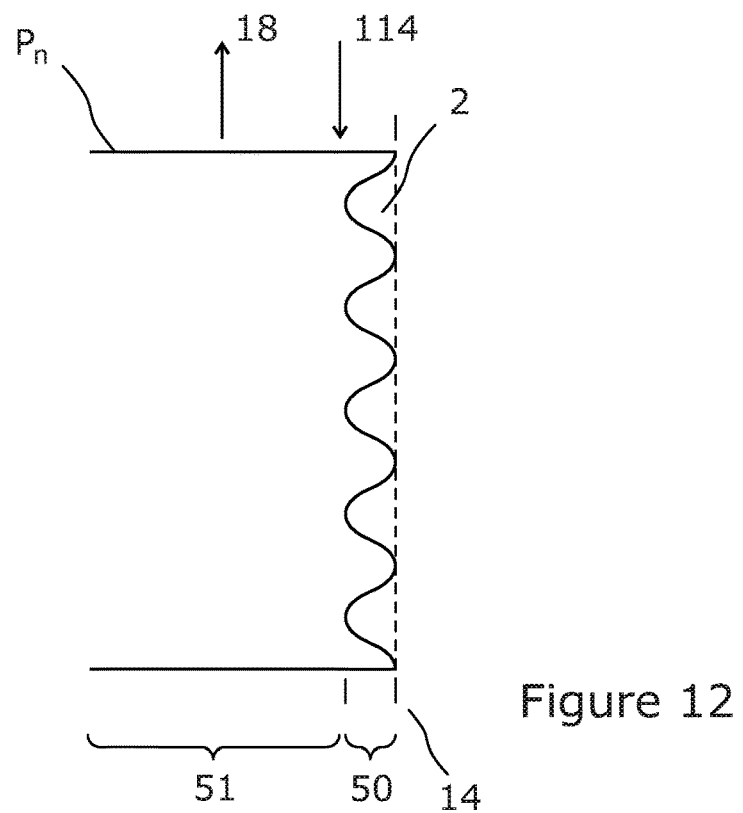

FIG. 11 shows an example of a ply Pn which in some examples may be included in the member 2 together with other plies (not shown) as a component of the composite in forming a modified edge region 50 of the member 2. One or both edges 114 of the ply Pn in the longitudinal direction 18 has an irregular profile, which in this example is a zig-zag profile, but could also be notched, curved along a sinusoidal, as shown in FIG. 12, or other recurved paths, or other periodic repeating patterns, etc. The zig-zag profile of the edge 114 reduces the amount of fibre in the edge region 50 whilst further reducing local stresses by distributing stress concentrations rather than them lying along the straight lines of the fibre layer edge or flexible or ductile strip edge. This technique may be used with any of the other examples of edge arrangements of the plies described above in relation to FIGS. 3 to 7.

Generally, the irregular edge profile 114 lies inboard of the outermost edge 14 of the finished product 2, either extending up to the edge 14 (as in FIG. 12) or leaving a gap (as in FIG. 11) so that the edges lying on the outer edge of the finished product will normally be straight. The irregular edge profile 114 also lies inboard of the innermost edge of any flexible or ductile strip 30 that may be present in that layer of the composite member 2, as shown in FIG. 11.

It will be appreciated that in some of the drawings the separation of the plies of material or laminae in the composite product is exaggerated for ease of illustration.

Embodiments of the present invention have been described with particular reference to the example illustrated. However, it will be appreciated that variations and modifications may be made to the examples described within the scope of the present invention.

The invention claimed is:

1. An extendible member comprising a laminated shell of plural fiber reinforced layers constructed and arranged to be configurable between a coiled form and an extended form, wherein in the extended form of the laminated shell is resiliently biased in the form of an elongate tube having longitudinal edges defining a slit in a longitudinal direction along a length of the laminated shell and wherein the laminated shell can be opened out at the slit to assume a flattened form in which the laminated shell can be wound about an axis extending transversely to the longitudinal direction of the laminated shell to assume the coiled form, wherein in the region of one or both longitudinal edges of the laminated shell, the amount of reinforcing fiber is less than in the region of the same laminated shell between the edge regions and wherein the laminated shell includes a flexible strip in the laminate in the edge region where there is less reinforcing fiber and not in the central region between the edge regions.

2. The extendible member of claim 1, wherein at least one layer of the laminated shell does not extend as far towards the edge of the laminated shell as at least one other layer of the laminated shell so as to reduce the amount of reinforcing fiber in the region of that edge.

3. The extendible member of claim 2, wherein at least one outer layer of the laminated shell does not extend to the edge of the laminated shell.

4. The extendible member of claim 3, wherein at least one inner layer of the laminated shell does not extend to the edge of the laminated shell such that the separation of the outer layers of the laminated shell is less in the edge region compared with the region between the edge regions.

5. The extendible member of claim 3, wherein the outer layer or outer layers of the laminated shell have angled plies relative to the longitudinal axis of the extendible member.

6. The extendible member of claim 5, wherein the fiber in the outer layer or outer layers of intrados and/or extrados faces of the extended laminated shell are arranged such that the outer layers exhibit a higher Poisson's ratio in the longitudinal direction and/or transversely extending axis of the extendible member than an inner layer or inner layers causing increased stability of the laminated shell when reconfigured from the extended form to the coiled form.

7. The extendible member of claim 3, wherein the flexible strip at least partly takes up the space left by the at least one outer layer not extending as far as at least one other layer.

8. The extendible member of claim 1, wherein at least three different layers of the laminated shell extend to different transverse extents.

9. The extendible member of claim 1, wherein at least one layer of the laminated shell has an uneven longitudinal edge profile.

10. The extendible member of claim 1, wherein the extendible member exhibits bi-stability in the coiled form and the extended form.

11. The extendible member of claim 1, wherein the laminated shell comprises a matrix material in which the reinforcing fibers are disposed and the flexible strip is the same as the matrix material.

12. The extendible member of claim 1, wherein the flexible strip is a polymer or other ductile, elastomeric, elasto-plastic or visco-elastic material.

13. The extendible member of claim 1, further comprising a flexible cord attached along the one or both of the longitudinal edges of the laminated shell.

14. The extendible member of claim 13, further comprising a flexible fabric or fiber sheath, wherein the flexible fabric or fiber sheath is used to attach the flexible cord to the both of the longitudinal edges of the laminated shell.

15. An extendible member comprising a lamination of layers of reinforcing fiber and first and second flexible cords which are laid up with a matrix material and heat and pressure applied to set the matrix material to manufacture a unitary composite product in which:
- a shell constructed and arranged from the layers of reinforcing fiber to be configurable between a coiled form and an extended form, wherein in the extended form the shell is resiliently biased in the form of an elongate tube having longitudinal edges defining a slit in a longitudinal direction along a length of the shell and wherein the shell can be opened out at the slit to assume a flattened form in which the shell can be wound about an axis extending transversely to the longitudinal direction of the shell to assume the coiled form, wherein the layers of fiber are arranged such that in the region of the longitudinal edges, the amount of reinforcing fiber in at least one layer is less than in the region between the edge regions; and
- the first and second flexible cords are positioned in the unitary composite product respectively along the longitudinal edges of the shell and are as thick as the shell in the region between the edge regions such that the first and second flexible cords relieve the pressure experienced by the edge regions when heat and pressure are applied when being laminated and so prevent over compaction of the edge regions in the manufactured unitary composite product.

16. The extendible member of claim 15, further comprising a flexible fabric or fiber sheath, wherein the flexible fabric or fiber sheath is used to attach at least one of the first and second flexible cords to the edge of the shell.

17. An extendible member comprising a laminated shell of plural fiber reinforced layers constructed and arranged to be configurable between a coiled form and an extended form, wherein in the extended form of the laminated shell is resiliently biased in the form of an elongate tube having longitudinal edges defining a slit in a longitudinal direction along a length of the laminated shell and wherein the laminated shell can be opened out at the slit to assume a flattened form in which the laminated shell can be wound about an axis extending transversely to the longitudinal direction of the laminated shell to assume the coiled form,
- wherein in the region adjacent to one or both longitudinal edges, either
  1) outer layers of reinforcing fiber on both sides of an inner layer of reinforcing fiber do not extend as far towards the longitudinal edge of the shell as the inner layer, or
  2) an inner layer of reinforcing fiber does not extend as far towards the longitudinal edge of the shell as both outer layers of the reinforcing fiber
- such that the amount of reinforcing fiber is less in the edge region or both edge regions of the laminated shell than in the region between the edge regions of the same laminated shell.

* * * * *